US011090717B2

(12) United States Patent
Brewer et al.

(10) Patent No.: US 11,090,717 B2
(45) Date of Patent: Aug. 17, 2021

(54) METHOD AND APPARATUS FOR HEAT TREATING FEEDSTOCK POWDER

(71) Applicant: THE BOARD OF TRUSTEES OF THE UNIVERSITY OF ALABAMA, Tuscaloosa, AL (US)

(72) Inventors: Luke N. Brewer, Tuscaloosa, AL (US); William A. Story, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 58 days.

(21) Appl. No.: 16/041,420

(22) Filed: Jul. 20, 2018

(65) Prior Publication Data
US 2019/0054526 A1 Feb. 21, 2019

Related U.S. Application Data

(60) Provisional application No. 62/535,417, filed on Jul. 21, 2017.

(51) Int. Cl.
*B22F 1/00* (2006.01)
*C23C 24/04* (2006.01)
*C22C 1/04* (2006.01)

(52) U.S. Cl.
CPC ............ *B22F 1/0085* (2013.01); *C23C 24/04* (2013.01); *B22F 2301/052* (2013.01); *B22F 2999/00* (2013.01); *C22C 1/0416* (2013.01); *C22C 1/0433* (2013.01); *C22C 1/0458* (2013.01)

(58) Field of Classification Search
CPC ...................................................... B22F 1/0085
See application file for complete search history.

(56) References Cited

U.S. PATENT DOCUMENTS

| | | | |
|---|---|---|---|
| 9,555,474 B2 | 1/2017 | She et al. | |
| 2013/0263698 A1* | 10/2013 | Hwang | B22F 1/0048 75/342 |
| 2017/0320135 A1* | 11/2017 | She | C21D 9/0062 |

OTHER PUBLICATIONS

Material Science, Prof. Satish V. Kailas, Chapter 6. Phase Diagrams, pp. 1-30, no date.*

* cited by examiner

*Primary Examiner* — Alex A Rolland
(74) *Attorney, Agent, or Firm* — Meunier Carlin & Curfman LLC

(57) ABSTRACT

Disclosed are methods and apparatuses for processing a powder alloy to improve its microstructure. The methods for processing the powder alloy can include introducing the powder alloy into a powder vessel having an inert atmosphere, uniformly heat treating the powder alloy inside the powder vessel at its solutionizing temperature, and cooling the heat treated powder alloy at a rate of at least 5° C./s to form treated particles. The treated particles obtained from the methods and apparatuses disclosed herein can be used in any suitable manufacturing process, such as in cold gas dynamic spray.

12 Claims, 14 Drawing Sheets

METHOD AND APPARATUS FOR HEAT TREATING FEEDSTOCK POWDER

CROSS REFERENCE TO RELATED APPLICATIONS

This application claims the benefit of priority to U.S. Provisional Application No. 62/535,417 filed Jul. 21, 2017, the disclosure of which is incorporated herein by reference in its entirety.

ACKNOWLEDGMENT OF GOVERNMENT SUPPORT

This invention was made with government support under Grant No. N00014-15-1-2133 awarded by the Office of Naval Research. The government has certain rights in the invention.

FIELD

The present disclosure relates generally to feedstock powders, particularly to methods and apparatuses for treating feedstock powders to improve their microstructure.

BACKGROUND

Cold gas dynamic spray (cold spray) is a technology developed in recent years for additive deposition of metal coatings. This spray deposition is achieved by accelerating small metal particles to supersonic velocities using heated, high pressure gas passed through a converging-diverging nozzle (FIG. 1). When the metal particles impact another piece of metal, the particles will adhere and weld to the underlying piece of metal in a manner similar to explosion welding.

Cold spray offers several advantages over traditional additive techniques. The most important advantage is the low heat input of cold spray. Although high temperature gas is used during the process, this gas cools rapidly as it expands and accelerates the particles through the nozzle. As a result of this, metal particles will not melt during spraying. This is an important consideration when dealing with aluminum alloys such as AA7075, AA2024, and AA2195 and for magnesium alloys such as, ZE41A. These alloys are used extensively in aerospace applications due to their exceptionally high strength to weight ratios compared to other alloys.

Cold spray is rapidly growing in its use in the aerospace industry. A non-comprehensive list of cold spray repairs demonstrated to be successful with the part returned service includes: repair of AA2024 skin panels on a B1 bomber, repair of A357 transmission housings used in aircraft, repair of magnesium gearbox housings for UH-60 and AH-64 helicopters, and repair of LAU-128 missile rails. It should be noted that in all these cases, repair with traditional coating techniques such as HVOF is difficult, and without cold spray repair these parts would have to be scrapped and replaced with new parts.

While there have been great advancements in cold spray over recent years, there are several limitations of the process that need to be overcome in order for the technology to live up to its full potential. One such barrier is the microstructure and properties of feedstock powders used in cold spray. Most powders in cold spray are produced using the process of gas atomization. Powders produced in this manner will have a cellular-dendritic microstructure (FIG. 2). For alloys such as the 2000/6000/7000 series aluminum, nickel super-alloys, maraging steels, and the like, this may result in a number of deleterious effects on the performance of the powder.

The reasons for these negative effects on the properties of the alloy can be due to the segregation of solutes (alloy additives) during solidification. Ideally the solute should be distributed evenly throughout the material rather than concentrated in a few areas. Traditionally, an alloy component is cast, and after casting the component is normalized by heating the material to a temperature just below its melting point. After holding the metal at this temperature for a specified amount of time, the metal is quenched in order to lock the solute atoms into a homogeneous distribution. This normalization does not take place in powders. They have the microstructure formed during rapid solidification, and this microstructure is not uniform. Networks of intermetallic compounds (white regions in FIG. 2) permeate each powder particle. When sprayed, the deposited material has a microstructure which is simply a deformed version of the original powder microstructure—intermetallic networks included. The presence of these networks increases the sensitivity of the deposited material to corrosion, reduces the formability of sprayed material, and may reduce the maximum strength that can be achieved in these materials.

The intermetallic networks may also reduce the efficiency with which material can be successfully deposited. Deposition efficiency is a measure of the fraction of the feedstock that is deposited during use. Generally, deposition efficiency is improved by increasing the velocity of the gas used in cold spray. However, due to technological limitations, it is difficult to achieve high deposition efficiency with as received AA7075 aluminum powder in an as atomized state. In order to achieve deposition efficiencies this high, very expensive helium must be used as the carrier gas and is typically consumed at a rate of 100 cubic feet per minute.

There is a need for feedstock powders with improved microstructure, thus exhibiting improved deposition efficiency in cold spray processes. The methods and apparatuses disclosed herein address these and other needs.

SUMMARY

Disclosed herein are methods and apparatuses for processing a powder alloy to improve its microstructure. The methods for processing the powder alloy can include introducing the powder alloy into a powder vessel having an inert atmosphere, uniformly heat treating the powder alloy inside the powder vessel at its solutionizing temperature, and rapid cooling of the heat treated powder alloy (solutionized powder alloy) to form treated particles. In some embodiments, the solutionized powder alloy can be cooled at a rate sufficient to reduce the intermetallic volume fraction of the powder alloy by at least 50%. For example, the cooling rate can be sufficient such that the intermetallic volume fraction of the treated particles is at least 50% lower, compared to the intermetallic volume fraction of the powder alloy (untreated particles). In some embodiments, the solutionized powder alloy can be cooled at a rate sufficient to obtain treated particles, wherein the treated particles have an intermetallic volume fraction of 5% or less. In some embodiments, the solutionized powder alloy can be cooled at a rate of at least 5° C./s to form treated particles, wherein the intermetallic volume fraction of the treated particles is lower than the intermetallic volume fraction of the powder alloy (untreated particles).

The powder alloys are heated at a temperature high enough to dissolve any intermetallic network present in the powder. In some embodiments, the powder alloys can be heat treated at a temperature below its solidus temperature, such as between its solvus and solidus temperature. For example, the powder alloy can be heat treated at a temperature of 1,200° C. or less, such as 1,100° C. or less, from 400° C. to 1,200° C., from 400° C. to less than 1,100° C., from 400° C. to 900° C. or from 450° C. to 550° C. One skilled in the art can determine the amount of time necessary for heating the powder alloys. In some embodiments, the powder alloys can be heat treated for at least 5 minutes such as from 5 minutes to 120 minutes. During the heat treatment, the powder alloys can be agitated such as by rotating the powder vessel with or without grinding media to reduce or eliminate sintering.

After heat treatment, the powder alloys can be rapidly cooled to form a homogeneous distribution of the powder components. As described herein, the heat treated powder alloy can be cooled at a rate of greater than 1° C./s. For example, the heat treated powder alloy can be cooled at a rate of at least 5° C./s, at least 10° C./s, at least 25° C./s, at least 50° C./s, at least 100° C./s, at least 150° C./s, at least 200° C./s, at least 250° C./s, from 10° C./s to 300° C./s, or from 100° C./s to 150° C./s. The heat treated powder alloy can be cooled at a high enough rate to a temperature such that minimal intermetallic precipitation occurs during quenching based on a quench factor analysis. This quench factor analysis identifies the amount of precipitation that will occur based upon the phase transformation kinetics for a specific alloy with a given time-temperature profile. In some examples, the heat treated powder aluminum alloy can be cooled rapidly (such as for 10 seconds or less) from its solutionizing temperature (for example, 450° C.) to a temperature low enough such that re-precipitation of an intermetallic phase will not take place (for example, at about 200° C.). Rapid cooling of the heat treated powder aluminum alloy may continue to room temperature or in some embodiments, the cooling rate can be slowed.

The heating and cooling steps disclosed herein can be repeated as desired, such as one, two, three, four, or more times.

The treated particles can comprise an intermetallic volume fraction that is at least 50% (such as at least 75%, at least 80%, at least 90%, at least 95%, or at least 98%) lower than the initial intermetallic volume fraction of the powder alloy. For example, the treated particles can comprise an intermetallic volume fraction of less than 5%, less than 4%, less than 3%, less than 2%, less than 1%, less than 0.5%, or less than 0.1%.

Apparatuses for performing the methods described herein are also disclosed. In some embodiments, the apparatus can include a furnace; a powder assembly vessel positioned in the furnace, wherein the powder assembly vessel comprises an inlet through which a gas or a powder enter into the powder assembly vessel; a rotary assembly in communication with the powder assembly vessel, wherein the rotary assembly is capable of rotating and agitating the powder in the assembly vessel; and a cooling system capable of cooling the powder in the powder assembly vessel at a rate of at least 10° C./s.

The powder assembly vessel can comprise a sensor for monitoring and/or controlling the temperature of the powder assembly vessel. This ensures uniform heating of the powder in the powder assembly vessel. Examples of sensors and controllers can include a series of thermocouples and a variable power supply. The powder assembly vessel can further comprise a device for excluding an interior portion of the powder assembly vessel during heat treatment. For example, the powder assembly vessel can comprise an extrusion to prevent the powder that is being heat treated from being outside of the range of temperature uniformity.

The powder assembly vessel can be manufactured from a material having sufficient strength at process temperatures, low chemical diffusivity at process temperatures, and sufficient thermal conductivity, conductive length scales, and resistance to thermal shock to achieve the desired heating and cooling rates. In some cases, the powder assembly vessel can be manufactured from a high temperature alloy such as steel.

The apparatus can include an inert gas source in communication with the inlet of the powder assembly vessel to provide gas into the powder assembly vessel.

The cooling system of the apparatus can be present within the powder assembly vessel, external of the powder assembly vessel, or a combination thereof. For example, in some embodiments, the cooling system can include cooling pipes that are internal to the powder assembly vessel. In other embodiments, the cooling system can include a brine bath, oil bath, or molten salt that are present external of the powder assembly vessel. In still other embodiments, the cooling system can include a jet quencher.

The treated particles obtained from the methods and apparatuses disclosed herein can be used in any suitable manufacturing process, such as in cold gas dynamic spray. In some embodiments, the methods disclosed herein can include conducting a cold gas dynamic spray manufacturing process with the treated particles. Prior to its use, the treated particles can be milled to reduce sintering. In some embodiments, the apparatuses disclosed herein can include an assembly for conducting a cold gas dynamic spray process.

The powder alloys that can be treated using the methods and apparatuses disclosed herein can include a 2000 series aluminum alloy, a 6000 series aluminum alloy, a 7000 series aluminum alloy, an alpha-beta titanium alloy, a nickel superalloy, a heat treatable magnesium alloy, a cobalt superalloy, a maraging steel, or a copper-beryllium alloy. Other powder alloys that can be treated include a 5000 series aluminum alloy, an austenitic stainless steel alloy, a brass alloy, a tool steel alloy, an oxide dispersion strengthened steel alloy, or a tantalum alloy.

BRIEF DESCRIPTION OF THE FIGURES

The accompanying figures, which are incorporated in and constitute a part of this specification, illustrate several aspects described below.

DETAILED DESCRIPTION

Figure 1:
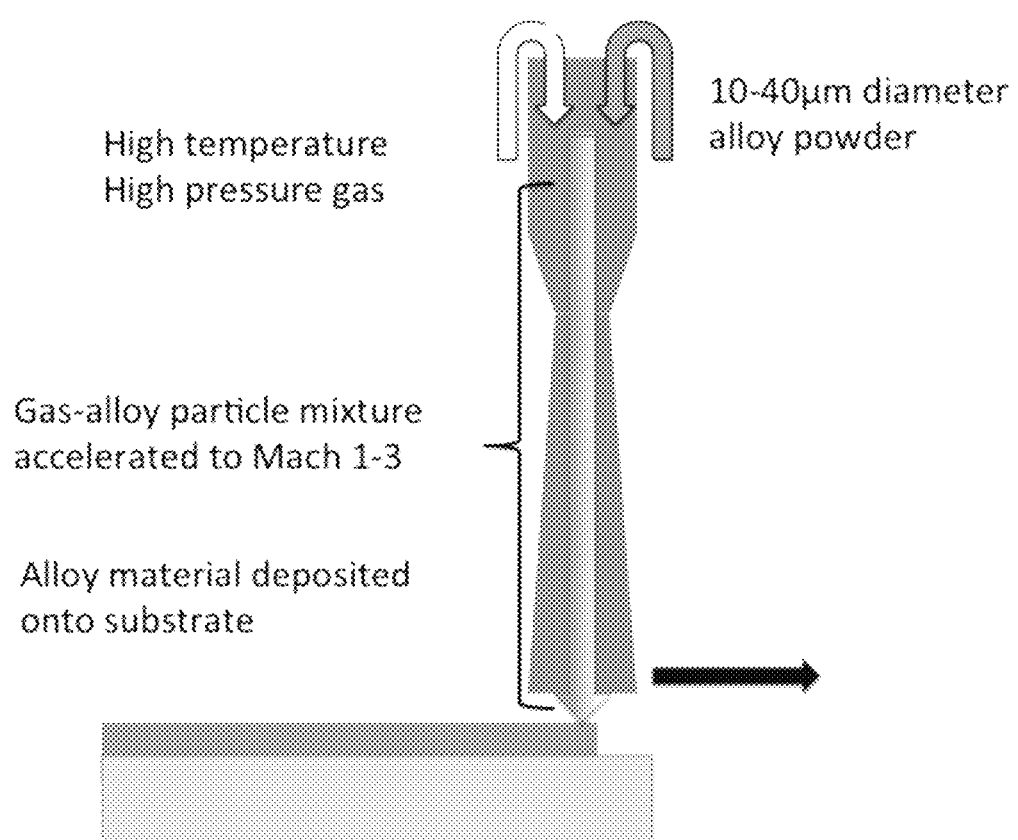
FIG. 1 is a schematic diagram illustrating a cold spray deposition process.
Figure 2:
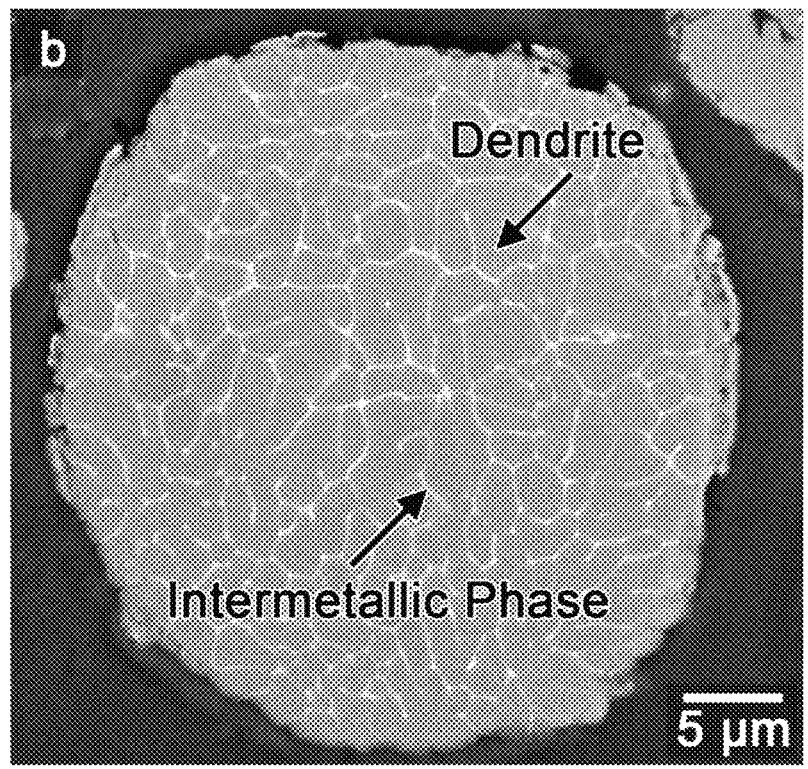
FIG. 2 is an electron backscatter image of an "as-received" AA7075 powder. The white regions are zinc-rich intermetallics which may have negative effects on deposits derived from the AA7075 powder.

The materials, compositions, articles, and methods described herein may be understood more readily by reference to the following detailed description of specific aspects of the disclosed subject matter and the Examples included therein and to the Figures.

Before the present materials, compositions, articles, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a cooling source" includes combinations of two or more such cooling sources, reference to "an alloy" includes mixtures of two or more such alloys, reference to "the powder" includes mixtures of two or more such powders, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

Reference will now be made in detail to specific aspects of the disclosed materials, compounds, compositions, articles, and methods, examples of which are illustrated in the accompanying Examples and Figures.

Materials and Compositions

Disclosed herein are methods and apparatuses for processing a powder to improve its microstructure. In some embodiments, the powder can include a feedstock powder, such as those used in cold spray. Changing some characteristics of the feedstock microstructure and/or morphology to effect reduction of the intermetallic networks (relative to such characteristics and properties for particles received after typical powder manufacturing processes) provide a homogenous particle to be fed, impact, and deform at the substrate thus forming a dense, high quality deposit.

Examples of powders that can be used in the methods disclosed herein include a metal or a metal alloy. In some embodiments, the powders can include a metal such as lithium, beryllium, magnesium, aluminum, calcium, scandium, titanium, vanadium, chromium, manganese, iron, cobalt, nickel, copper, zinc, gallium, strontium, yttrium, zirconium, niobium, molybdenum, technetium, ruthenium, rhodium, palladium, silver, cadmium, indium, tin, barium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, thorium, or any combination thereof.

In some embodiments, the powders can comprise one or more base metals. The base metal can be present in an amount of greater than 50% by weight of the powder. For example, the powders can comprise 55% or greater, 60% or greater, 65% or greater, 70% or greater, 75% or greater, 80% or greater, 85% or greater, 90% or greater, or 92% or greater, by weight of a base metal. In some embodiments, the powder can comprise from 50% to 95% (e.g., from 55% to 95%, from 65% to 95%, from 75% to 95%, or from 85% to 95%) by weight of a base metal.

The powders can also include a minor amount of non-metal. For example, the powders can also include less than 50% by weight of a non-metal. In some embodiments, the powders can comprise 45% or less, 40% or less, 35% or less, 30% or less, 25% or less, 20% or less, 15% or less, 10% or less, 9% or less, 8% or less, 7% or less, 6% or less, 5% or less, 4% or less, 3% or less, 2% or less, or 1% or less by weight of a non-metal. Examples of non-metals that may be present in the powders can include sulphur, phosphorous, carbon, boron, oxygen, nitrogen, silicon, hydrogen, or combinations thereof.

In specific examples, the powder can be one in which strength, ductility, deposition efficiency, and/or corrosion resistance of cold spray deposits can be improved by heat treatment of the powder. In particular, powders that can form strengthening precipitates are useful in the methods disclosed herein. Examples of such powders can include the 7000 series aluminum alloys (e.g., AA7075, AA7050), 2000 series aluminum alloys (e.g., AA2024, AA2195), 6000 series aluminum alloys (e.g., AA6061, AA6063), alpha-beta titanium alloys (e.g., Ti-6Al-4V, Ti-8Al-1Mo-1V), nickel super alloys (e.g., Inconel 718, CMSX2, Waspaloy, MAR-M200), cobalt super alloys (e.g. stellite-6, X40), maraging steels (e.g., Grade 250, 17-4 PH), magnesium alloys (e.g. ZE41A, ZK61A), copper-beryllium alloys (e.g., C17200, C17300), or combinations thereof.

In other specific examples, the powder can be one in which ductility, deposition efficiency, and/or corrosion resistance of cold spray deposits can be improved by heat treatment of the powders. In particular, powders that do not form strengthening precipitates but benefit from particle microstructure homogenization are useful in the methods disclosed herein. Examples of such powders can include the 5000 series aluminum alloys (e.g., AA5082, AA5083), austenitic stainless steel alloys (e.g., SS304, SS316), brass alloys (e.g., C46400, C44300), tool steel alloys (e.g., H13, M42), oxide dispersion strengthened steel alloys (e.g., MA956, PM2000, 14YWT), tantalum alloys (e.g., Ta-10W, Ta-40Nb), or combinations thereof.

Treated Particles

The powders can be treated using the methods disclosed herein to provide treated particles. The treated particles can comprise a more homogenous distribution of the intermetallic secondary phases in the particle's matrix, compared to the untreated powder. In some embodiments, the treated particles can have an intermetallic volume fraction that is 50% or less than the intermetallic volume fraction of the untreated powder. For example, the treated particles can have an intermetallic volume fraction that is 55% or less, 60% or less, 65% or less, 70% or less, 75% or less, 80% or less, 85% or less, 90% or less, 95% or less, 97% or less, 98% or less, 99% or less, or up to 100% less than the intermetallic volume fraction of the untreated powder. For example, the treated particles can comprise an intermetallic volume fraction of less than 5%, less than 4%, less than 3%, less than 2%, less than 1%, less than 0.5%, or less than 0.1%. The amount of intermetallic present in the powder can be determined by cross sectioning and using a microscope to determine volume fraction of solution to intermetallics.

The treated particles can also be distinguished from the untreated particles by using nano-indentation to determine the stress-strain behavior of the powders. The stress-strain behavior of the powders can also be determined by testing the compressibility of a powder sample. For alloys that benefit from precipitation strengthening, the stress/strain behavior will be different before and after powder the powder is aged. For example, without any aging, the treated powder would exhibit a lower yield strength and higher ductility than "as-received" and with a specified amount of aging, the treated powder would exhibit a higher yield strength and higher ductility than "as-received".

The treated particles disclosed herein can have an average particle size. "Average particle size" and "mean particle size" are used interchangeably herein, and generally refer to the statistical mean particle size of the particles in a population of particles. For example, the average particle size for particles with a substantially spherical shape can comprise the average diameter of the plurality of particles. For a particle with a substantially spherical shape, the diameter of a particle can refer can refer to the largest linear distance between two points on the surface of the particle. Mean particle size can be measured using methods known in the art, such as evaluation by optical microscopy, scanning electron microscopy, and/or dynamic light scattering.

The treated particles can have, for example, an average particle size of (e.g., within ±0.5) 5 microns ($\mu$m) or greater, 8 $\mu$m or greater, 10 $\mu$m or greater, 12 $\mu$m or greater, 15 $\mu$m or greater, 18 $\mu$m or greater, 20 $\mu$m or greater, 22 $\mu$m or greater, 25 $\mu$m or greater, 28 $\mu$m or greater, 30 $\mu$m or greater, 32 $\mu$m or greater, 35 $\mu$m or greater, 47 $\mu$m or greater, or 50 $\mu$m or greater. In some embodiments, the treated particles can have, for example, an average particle size of (e.g., within ±0.5) 50 $\mu$m or less, 48 $\mu$m or less, 45 $\mu$m or less, 43 $\mu$m or less, 40 $\mu$m or less, 38 $\mu$m or less, 35 $\mu$m or less, 33 $\mu$m or less, 30 $\mu$m or less, 27 $\mu$m or less, 25 $\mu$m or less, 23 $\mu$m or less, 20 $\mu$m or less, 18 $\mu$m or less, 15 $\mu$m or less, 12 $\mu$m or less, 10 $\mu$m or less, 8 $\mu$m or less, or 5 $\mu$m or less. In some embodiments, the treated particles can have, for example, an average particle size of (e.g., within ±0.5) from 5 $\mu$m to 50 $\mu$m, from 10 $\mu$m to 50 $\mu$m, from 15 $\mu$m to 50 $\mu$m, from 5 $\mu$m to 45 $\mu$m, from 10 $\mu$m to 45 $\mu$m, from 5 $\mu$m to 40 $\mu$m, or from 10 $\mu$m to 40 $\mu$m. The treated particles can retain substantially the same size and shape as the untreated powder.

In some examples, the treated particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

Method and Apparatus

Figure 3A:
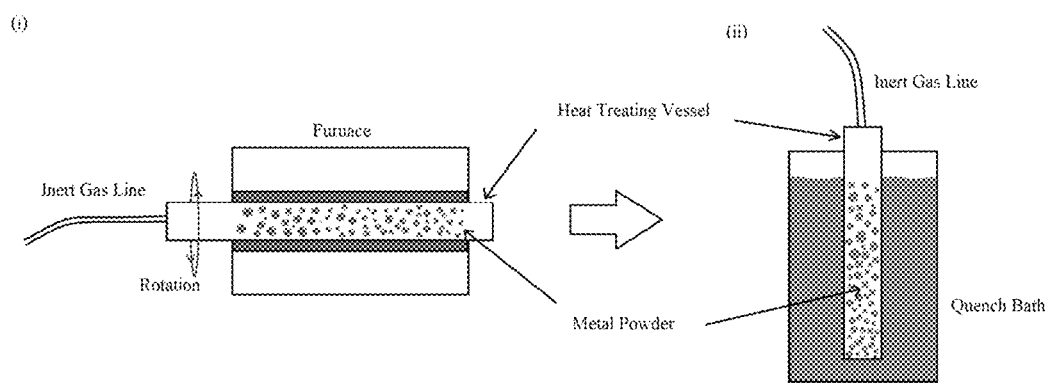
FIGS. 3A-3F illustrate apparatuses used to process feedstock powders as disclosed herein.
Figure 3B:
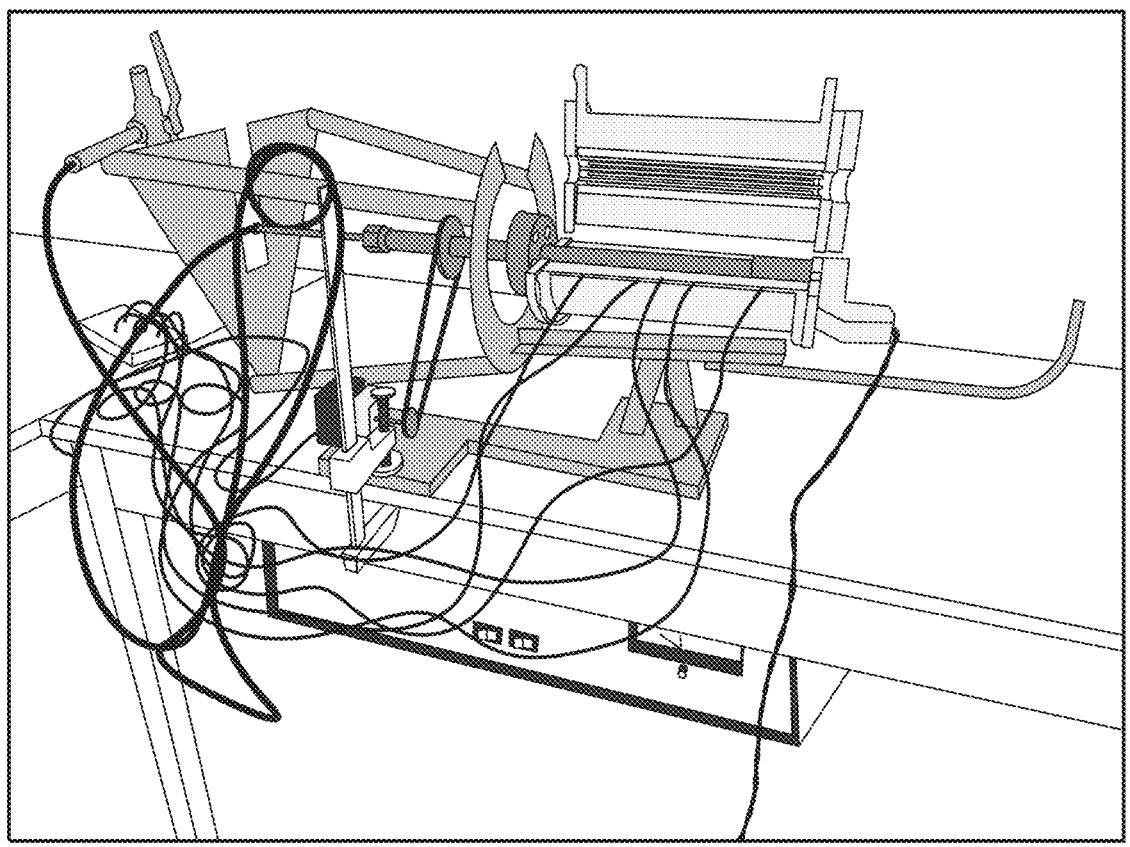

The methods for processing for the powders disclosed herein can incorporate an assembly 25 (FIG. 3B). The methods can include a heat treatment step and a cooling step. For example, the methods can include introducing the powder into a powder assembly vessel 24 for heat treatment. For metal powders such as aluminum powders used in cold spray, flammability is of great concern due to the high surface area to volume ratio. In addition to releasing flammable hydrogen gas, metals such as aluminum oxidizes in water and releases twice as much heat as nitroglycerin per mass. For this reason, it is preferred that an inert atmosphere is maintained while heating the powders and to avoid direct contact with water during quenching. In some examples, an inert atmosphere can be created by gases such as helium, nitrogen, argon, carbon dioxide, and the like.

The methods can include heat treating the powder inside the powder assembly vessel 24 at an elevated temperature to solutionize the powder. The term "solutionize," as used herein refers to a temperature high enough to take into solid solution solid particles including coarse dendritic particles, but low enough to avoid melting. Accordingly, the heat treatment depends on the particular powder being treated. In general, when the metal powder comprises an alloy which can form strengthening precipitates, the solutionizing temperature used can be between the solvus and solidus temperatures for the alloys. When the metal powder does not form strengthening precipitates but benefits from particle microstructure homogenization, the solutionizing temperature used can be lower than the solidus temperature but high enough such that the homogenization occurs within a short enough time.

By definition, the solidus is the equilibrium temperature at which liquid first forms in a homogenous alloy. The solvus is the temperature at which the last precipitates are taken into solution. The "solvus" and "solidus" temperatures can be determined by metallographic examination of a series of samples aged at various temperatures in the vicinity of the solvus, by differential thermal analysis (DTA), or using x-ray diffraction. Guidelines for the solutionizing time and temperature can be found in the ASM Handbook Volume 4.

In some embodiments, the powders can be heat treated at a temperature of 400° C. or greater, 450° C. or greater, 500° C. or greater, 550° C. or greater, 600° C. or greater, 650° C. or greater, 700° C. or greater, 750° C. or greater, 800° C. or greater, 850° C. or greater, 900° C. or greater, 950° C. or greater, 1,000° C. or greater, 1050° C. or greater, 1,100° C. or greater, or 1,150° C. or greater. In some embodiments, the heat treatment temperature can be 1,200° C. or less, 1,150° C. or less, 1,100° C. or less, 1,050° C. or less, 1,000° C. or less, 950° C. or less, 900° C. or less, 850° C. or less, 800° C. or less, 750° C. or less, 700° C. or less, 650° C. or less, 600° C. or less, or 550° C. or less. In some embodiments, the heat treatment temperature can be from 400° C. to 1,200° C., from 400° C. to 1,100° C., from 450° C. to 1,100° C., from 400° C. to 1,000° C., from 400° C. to 900° C., from 400° C. to 700° C., from 400° C. to 600° C., from 400° C. to 550° C., from 450° C. to 1,000° C., or from 500° C. to 900° C.

The powders disclosed herein can be heat treated for at least 5 minutes, at least 10 minutes, at least 15 minutes, at least 20 minutes, at least 45 minutes, at least 1 hour, at least 1.5 hours, or at least 2 hours. In some embodiments, the powders can be heat treated for between 2 minutes and 150 minutes, between 5 minutes and 120 minutes, between 5 minutes and 25 hours, such as between 5 minutes and 10 hours, between 5 minutes and 120 minutes, or between 5 minutes and 60 minutes. It would be clear to the skilled artisan the amount of time required to heat treat these powders depending on the kinetics of the alloy and heat transfer in the system.

It is desirable that the powders are heated uniformly. For example, aluminum alloys solutionize at temperatures close to their melting point, and therefore, partial melting is often found in wrought aluminum plate due to imperfect temperature control. This can cause sintering if the aluminum is in powder form. This sintering can dramatically reduce the powder's flowability and its use in an additive process, such as their deposition efficiency in cold spray processes. Sintering can be reduced by uniform heating and/or continuous agitation (for example, mechanical agitation) of the particles during heating. In some embodiments, the powder vessel assembly 24 is continuously rotated during the process. In some embodiments, the inert gas can be used to agitate the powder and may also be used to treat the powder particles. In some embodiments, the apparatuses disclosed herein can include a rotary assembly 23 for agitating the powders.

The methods can further include rapidly cooling the heat treated powder. Without wishing to be bound by theory, a reason for the negative effects on the properties of alloys is due to the segregation of solutes (alloy additives) during solidification. Ideally the solute should be distributed evenly throughout the material rather than concentrated in a few areas. Traditionally, an alloy component is cast, and after casting the component is normalized by heating the material to a temperature just below its melting point. After holding the metal at this temperature for a specified amount of time, the metal is quenched. Powders processed in this manner generally do not exhibit a homogeneous distribution.

The heat treated powder can be cooled to reduce the amount of solute segregation present in the powder. In some embodiments, the heat treated powder can be cooled at a rate sufficient to reduce the intermetallic volume fraction of the powder alloy by at least 20%, at least 40%, at least 50%, at least 60%, or at least 75%, compared to the intermetallic volume fraction of the treated particles. In some embodiments, the heat treated powder can be cooled at a rate sufficient to obtain treated particles, wherein the treated particles have an intermetallic volume fraction of 5% or less. The required cooling rate and the temperature at which and to which the alloy is cooled to can vary depending on the type of alloy used as well as the desired properties. In some embodiments, quench factor analysis can be used to determine the cooling rate and end temperature needed. Quench factor analysis provides a single value that quantitatively classifies quench severity for a specific alloy. Quench factor analysis is an analysis of the cooling curve associated with a particular quench coupled with a Time Temperature Property (TTP) curve. In some embodiments, the heat treated powder can be cooled to a temperature at which a constant amount of new phase is being formed in the treated particles. In specific examples, to provide a treated particle within 90% of the maximum yield strength after aging, the aluminum alloy AA7075 can be cooled at a rate of 100° C./s to 300° C./s in the temperature range of 400° C. to 290° C. while the aluminum alloy AA7050 can be cooled at a rate of as low as 10° C./s.

To optimize the properties of the powders disclosed herein, a cooling rate of greater than 1° C./s can be used after holding at the solutionizing temperature. For example, the heat treated powders can be cooled at a rate of at least 5° C./s, at least 10° C./s, at least 20° C./s, at least 30° C./s, at least 40° C./s, at least 50° C./s, at least 60° C./s, at least 70° C./s, at least 80° C./s, at least 90° C./s, at least 100° C./s, at least 105° C./s, at least 110° C./s, at least 120° C./s, at least 130° C./s, at least 150° C./s, at least 180° C./s, at least 200° C./s, at least 250° C./s, or at least 300° C./s. In some embodiments, the heat treated powders can be cooled at a rate of from 10° C./s to 300° C./s, from 10° C./s to 200° C./s, from 10° C./s to 150° C./s, from 10° C./s to 120° C./s, from 30° C./s to 150° C./s, from 30° C./s to 100° C./s, from 50° C./s to 150° C./s, from 50° C./s to 100° C./s, from 75° C./s to 150° C./s, from 80° C./s to 150° C./s, from 100° C./s to 300° C./s, from 100° C./s to 150° C./s, from 100° C./s to 140° C./s, from 100° C./s to 135° C./s, or from 105° C./s to 150° C./s.

The heat treated powder can be cooled to below its solvus temperature. For example, the heat treated powder can be cooled to less than 1,200° C., less than 1,150° C., less than 1,100° C., less than 1,050° C., less than 1,000° C., less than 950° C., less than 900° C., less than 850° C., less than 800° C., less than 750° C., less than 700° C., less than 650° C., less than 500° C., less than 400° C., less than 300° C., less than 200° C., less than 150° C., less than 100° C., or to room temperature.

Cooling can be carried out by any suitable method. In some embodiments, the apparatus can include internal cooling pipes through the powder assembly vessel 24 which are used to cool the powder. In some embodiments, the powder may be blown out of vessel 24 into a separate cooling vessel. In still other embodiments, the powder assembly vessel 24 can be placed into a cooling assembly such as a water bath, a brine bath, an oil bath, molten salt, or such the like. The bath can be agitated, for example, using compressed air for more efficient cooling. In still other embodiments, the powder can be cooled via jet quenching.

Conduction of heat through the vessel walls 21 of the powder assembly vessel 24 allows the powder to be cooled at a sufficiently high rate to achieve the desired microstructure. To facilitate rapid heating and cooling of the powder, the powder vessel assembly 24 can be fabricated from a material that has sufficient thermal conductivity, conductive length scales, and resistance to thermal shock. The material can also be structurally strong enough, e.g. has a high melting temperature, to survive thermal conditions from furnace, but that is inexpensive to produce. In some examples, the powder vessel assembly 24 can be fabricated from mild steel and the gas can be selected to prevent the mild steel from oxidizing.

In some embodiments, the treated particles can be cooled to the desired temperature (for example, to a temperature where minimal intermetallic precipitation occurs during quenching based on a quench factor analysis) within 50 seconds. For example, the treated particles can be cooled within 40 seconds, within 30 seconds, within 25 seconds, within 15 seconds, within 10 seconds, within 9 seconds, within 8 seconds, within 7 seconds, within 6 seconds, or within 5 seconds.

FIG. 3B is a schematic, cross sectional view of an exemplary embodiment of an apparatus (furnace assembly) that can be used in the methods disclosed herein. A powder 16 is loaded into powder assembly vessel 24. The powder assembly vessel is connected to a rotary assembly 23. When the rotary assembly 23 and the powder assembly vessel 24 are connected, they comprise an air-tight heat treatment vessel 25. The rotary assembly 23 and the powder assembly vessel 24 can be connected using any means that is conventionally used in the art. In this embodiment, the rotary assembly 23 and the powder assembly vessel 24 are connected using a flanged joint 9A, 9B connected using bolts 18A, 18B, and 18C, nuts 20A, 20B, and 20C, a high temperature gasket 10, and washers 19A, 19B, 19C, 19D, 19E, and 19F. The apparatus can include an extrusion 14 that extends out of assembly 23 into assembly 24 to prevent the powder 16 that is being heat treated from being outside of the range of temperature uniformity. There can be an inlet 13 through the extrusion to allow an inert gas into assembly 24. The inlet extends from extrusion 14 to the tee-adapter 22 on assembly 24. A pressure release valve 4 can be connected to 22 in order to prevent the build-up of unsafe pressures. The apparatus can include an inline particle filter 3 connected to tee-adapter 22 in order to prevent damage of up-stream components e.g. rotary union and gas regulator. In some embodiments, the inline particle filter 3 can be a 0.5 μm filter. A rotary union 2 can be connected to the inline particle filter 3. A supply of inert gas 1 can be connected to the rotary union 2.

Figure 3C:
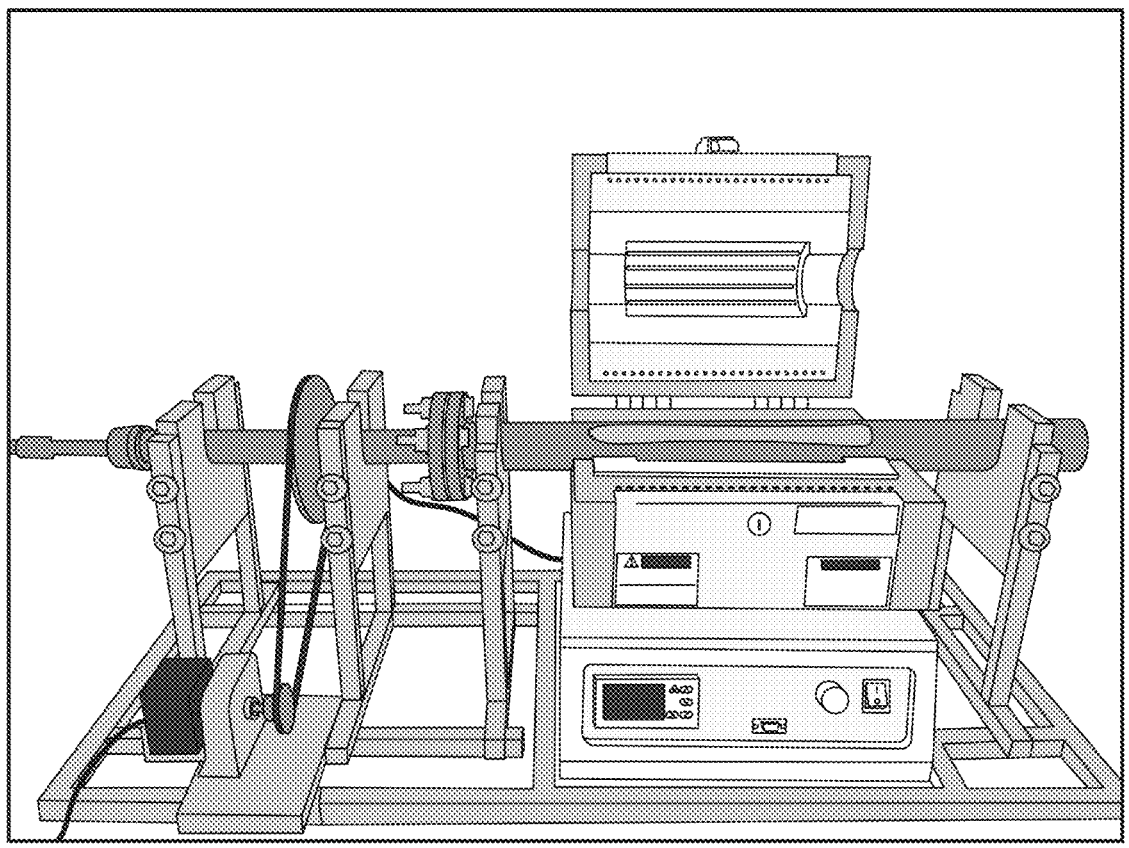
Figure 3D:
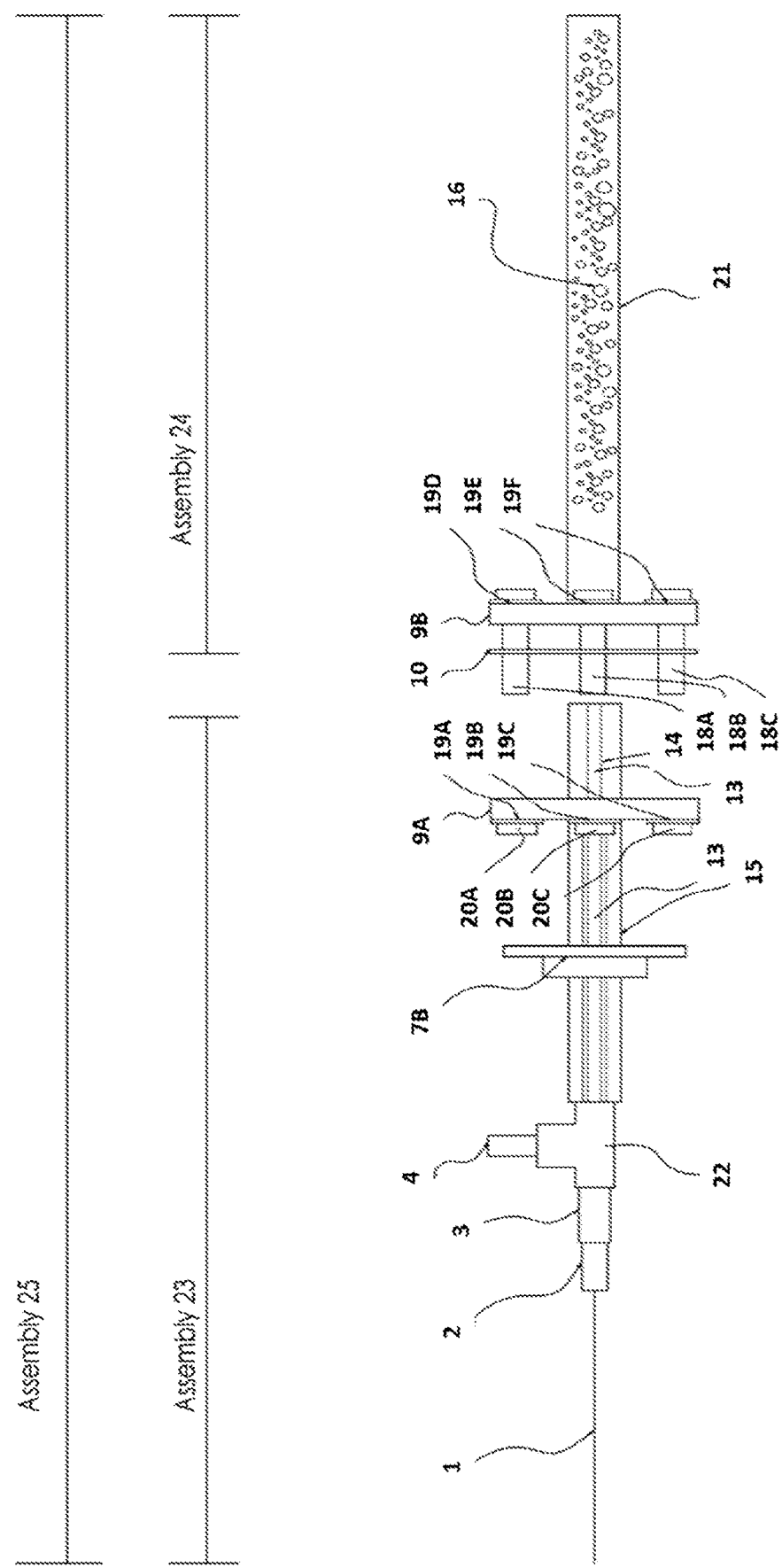
Figure 3E:
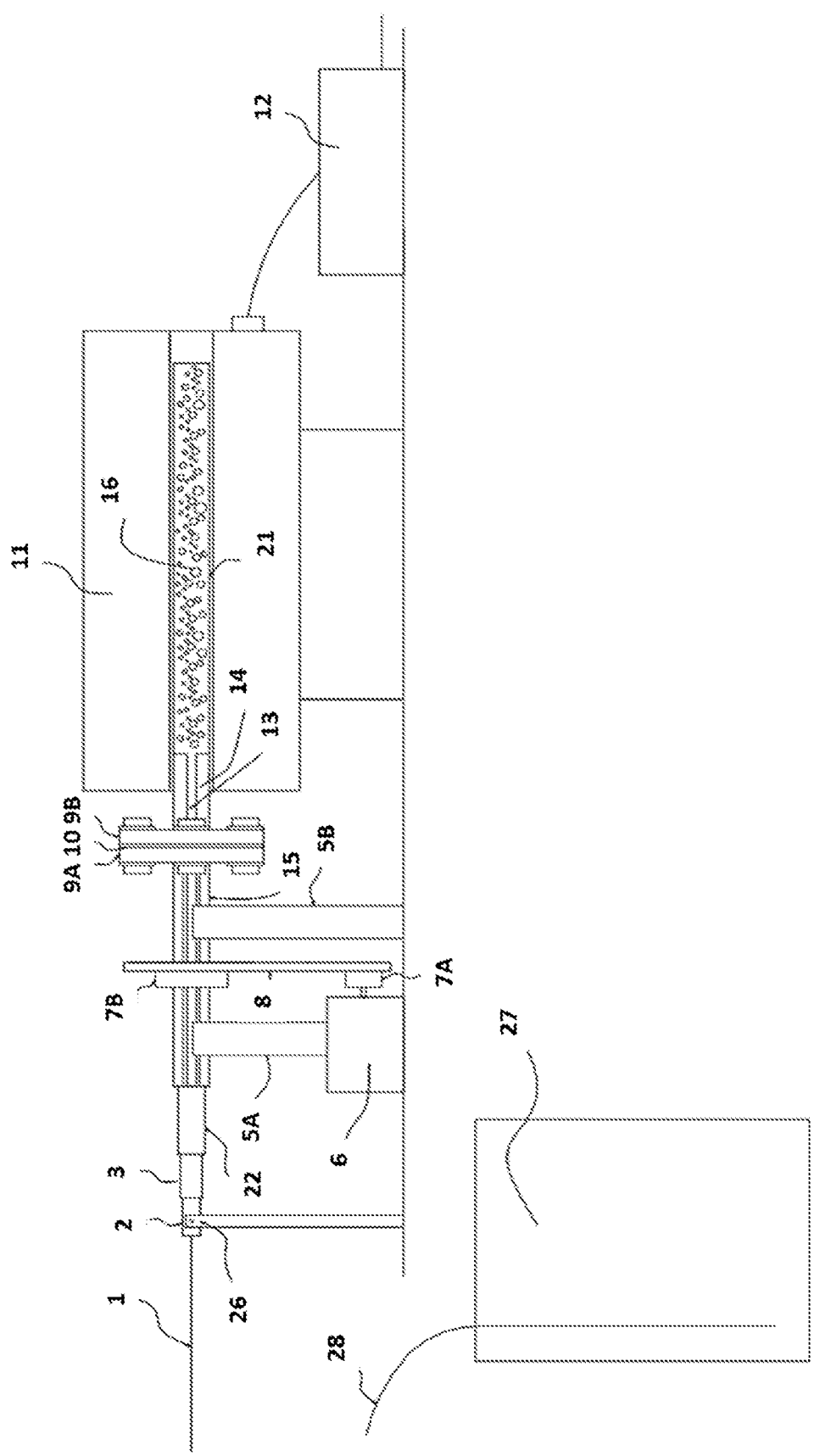
Figure 3F:
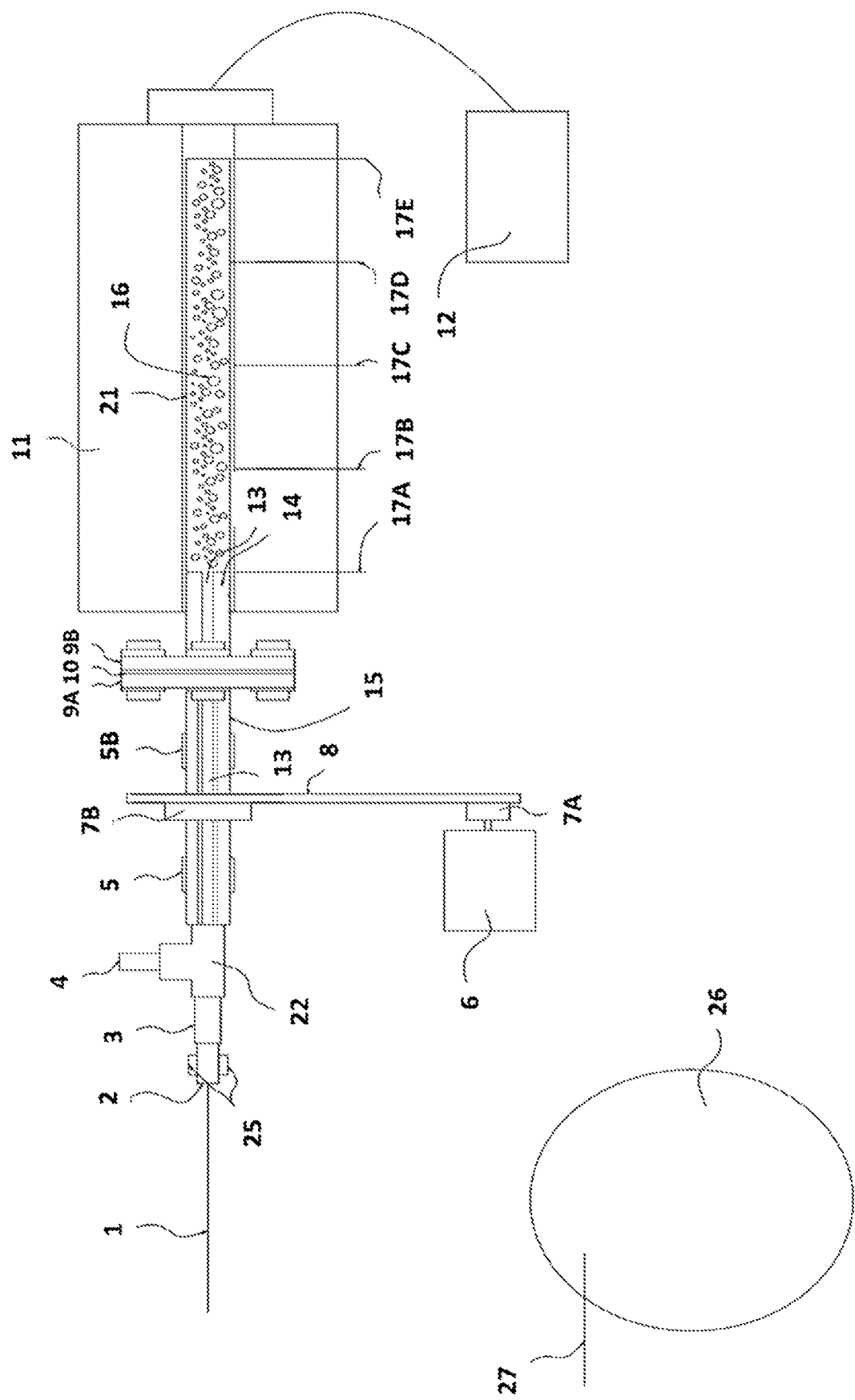
Figure 4A:
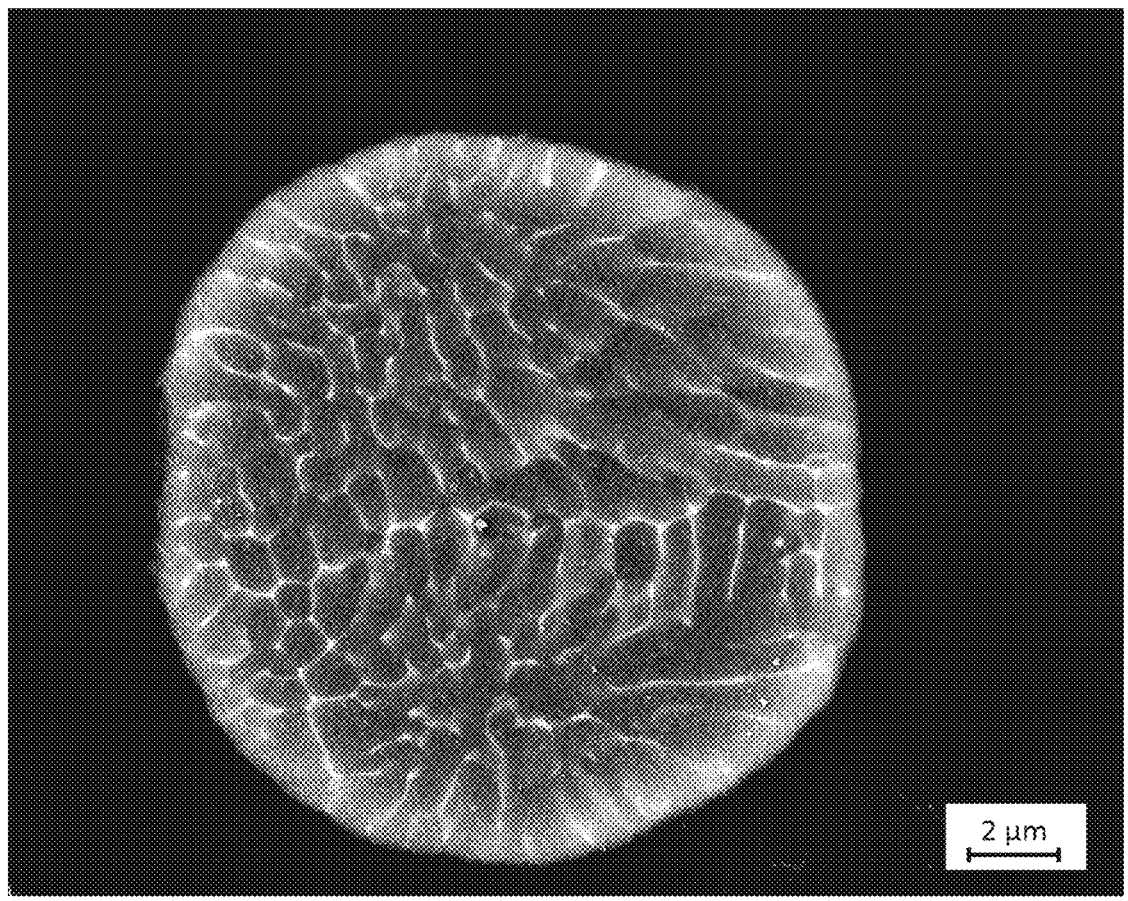
FIGS. 4A-4B are electron backscatter images of "as-received" AA7075 powder (FIG. 4A) and processed AA7075 powder (FIG. 4B). The zinc (bright white regions) is more evenly distributed throughout the processed powders, which will result in higher quality deposits.
Figure 4B:
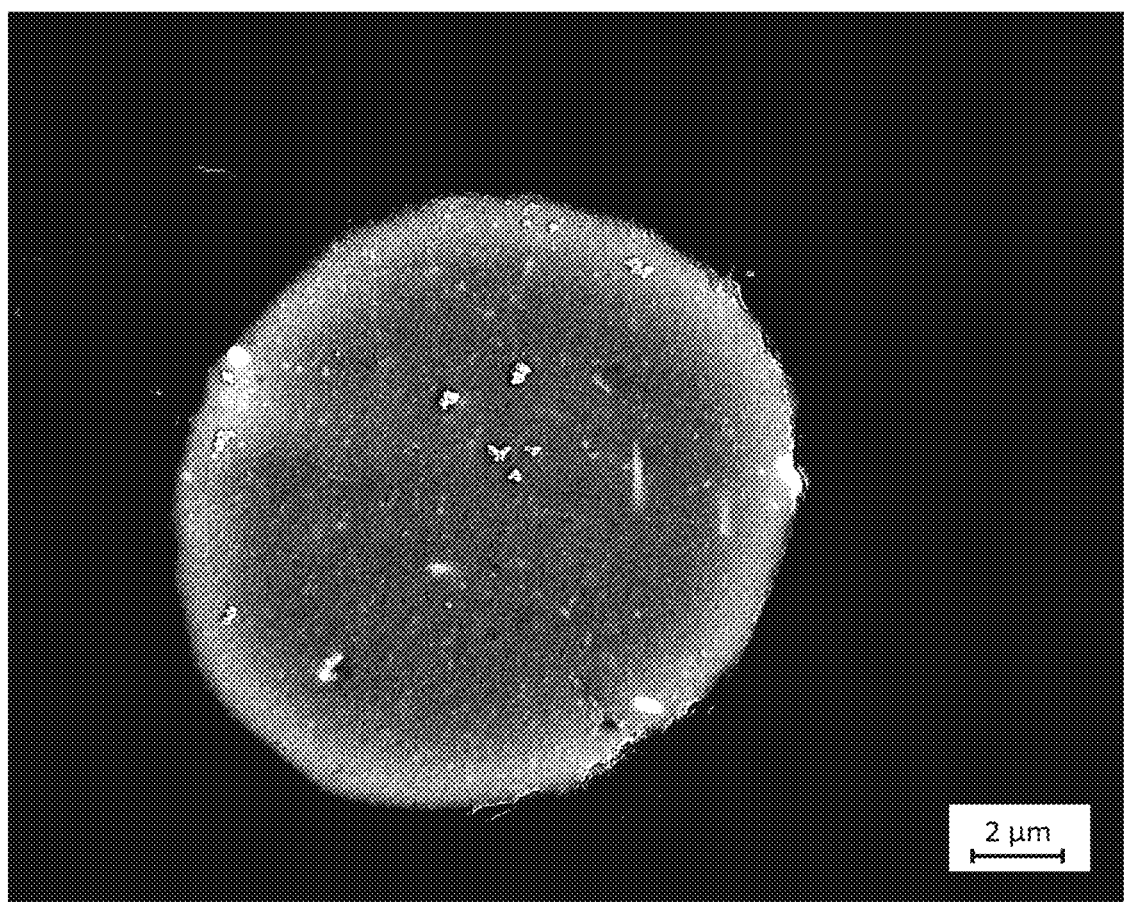
Figure 5A:
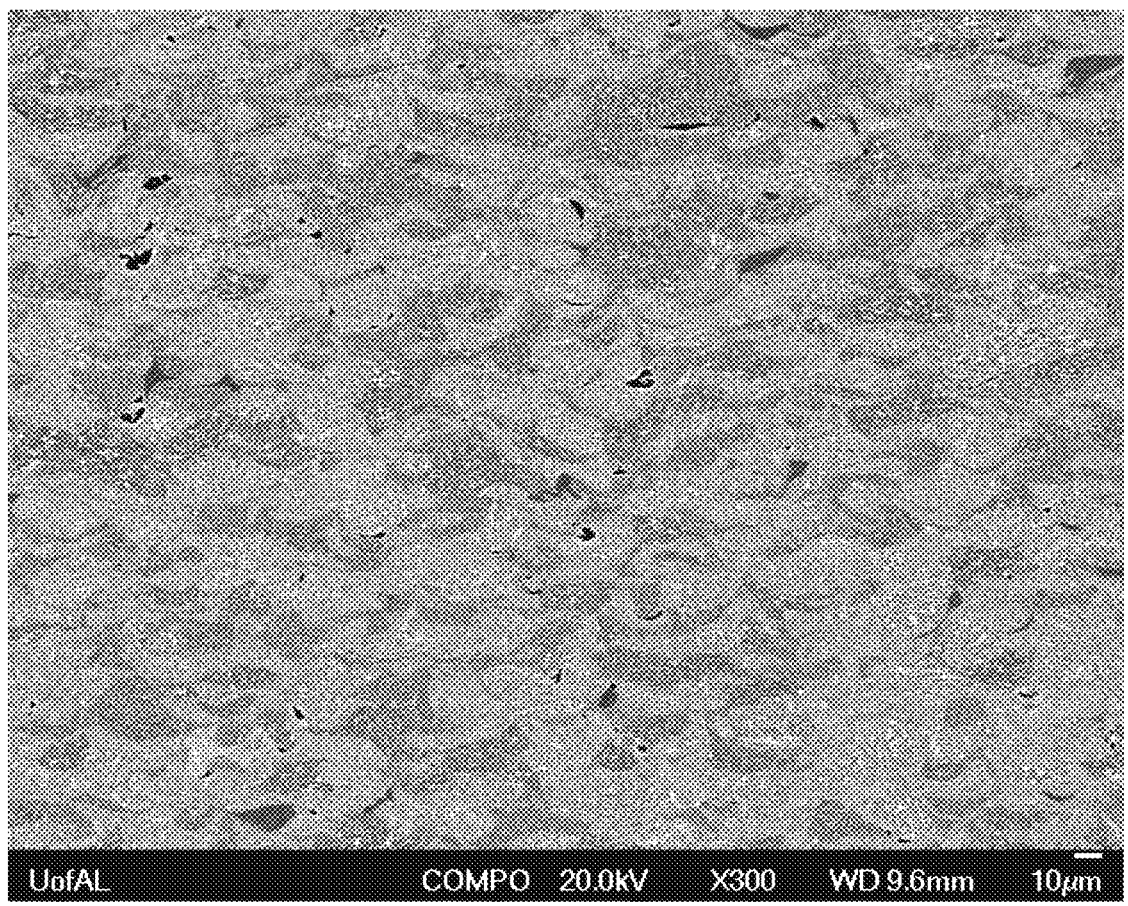
FIGS. 5A-5D are backscatter electron (BSE) images of cold spray deposits produced with "as-received" AA7075 powder (300×, FIG. 5A), "as-received" AA7075 powder (1000×, FIG. 5B), processed AA7075 powder (300×, FIG. 5C), and processed AA7075 powder (1000×, FIG. 5D). The white regions are zinc rich areas and the black regions are pores. As shown, the microstructure is more uniform in FIGS. 5C and 5D than in FIGS. 5A and 5B, which will result in superior performance.
Figure 5B:
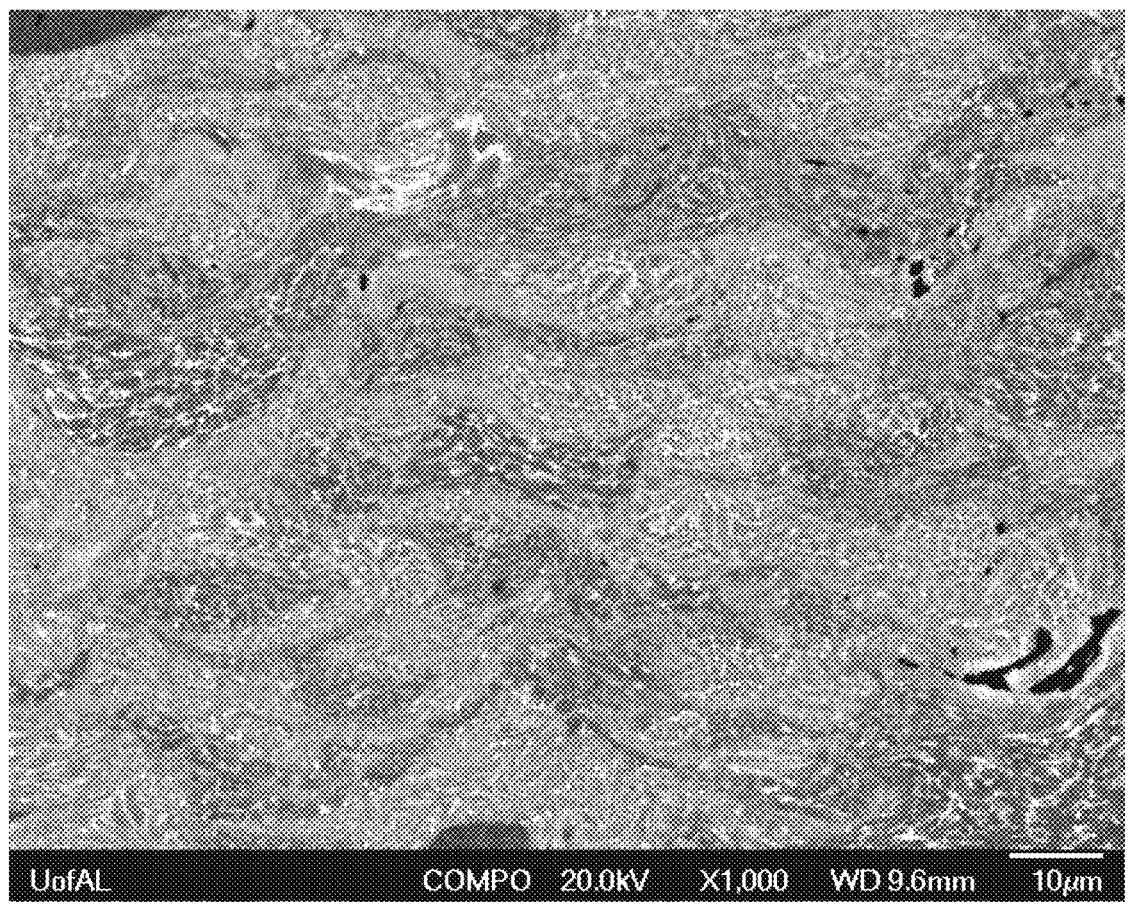
Figure 5C:
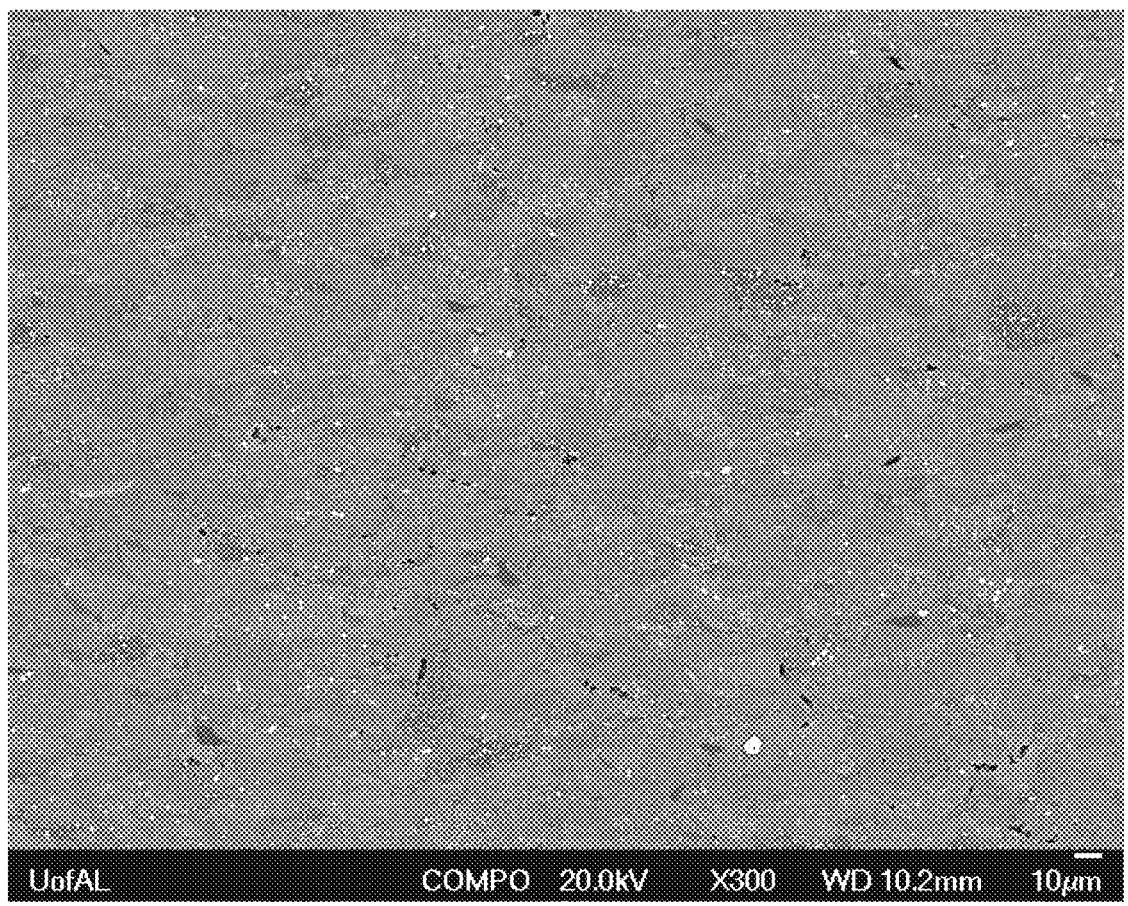
Figure 5D:
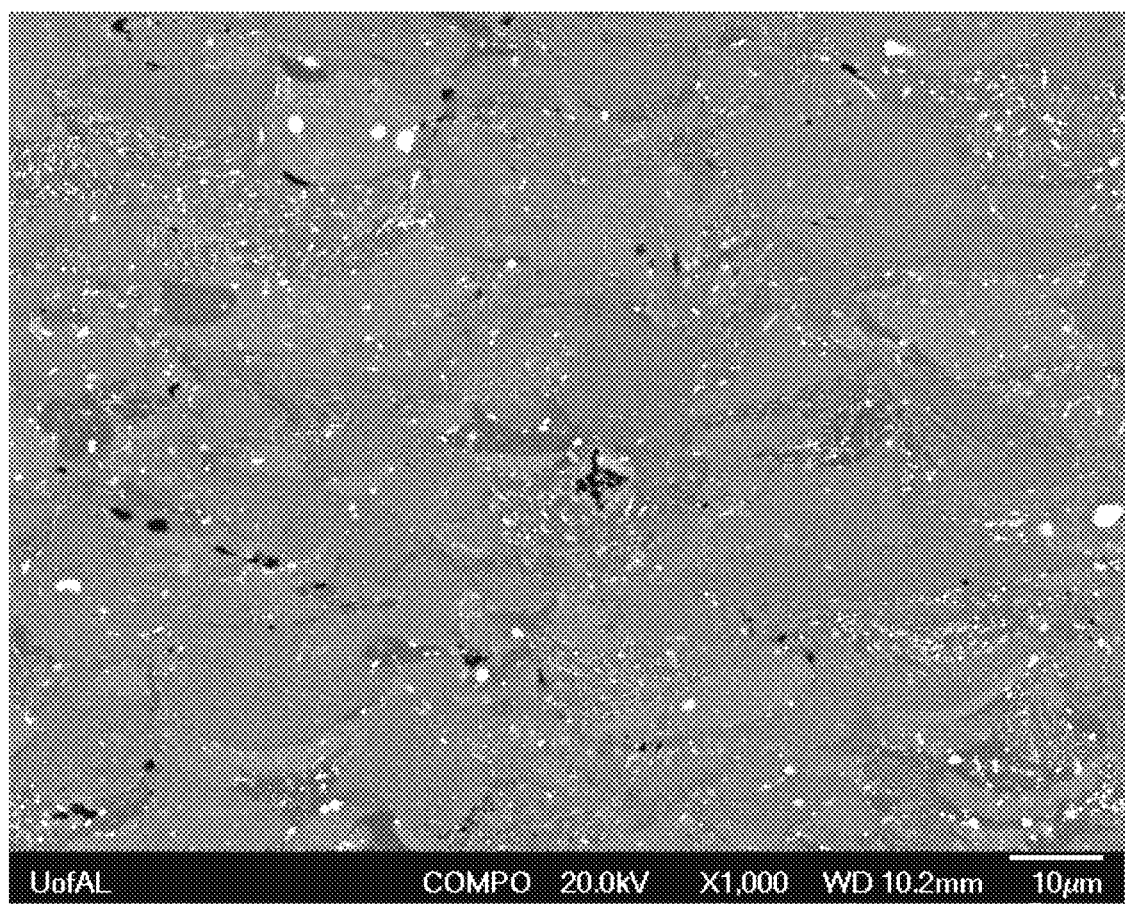

FIG. 3C and FIG. 3D are schematic, cross sectional view of other exemplary embodiments of the apparatus (furnace assembly) disclosed herein. The powders inside the powder assembly vessel 24 are heated by heat source 11. Examples of heat source can include a furnace such as an electric tube furnace, an induction furnace, a box furnace, a salt bath, or a gas furnace. In order to maintain the necessary temperature for heat treatment, there can be a method of measuring and controlling the process temperature. In some embodiments, the temperature can be monitored using thermocouples 17A, 17B, 17C, 17D, and 17E and the temperature controlled using a variable power supply 12.

In order to prevent sintering of the powders during heat treatment, a method of manual agitation can be employed. This can be achieved in this embodiment by rotating 25 (the powder assembly vessel 24 and the rotary assembly 23). In other embodiments, the inclusion of ball-milling media during heat treatment or vibration may be used. In this embodiment, a sprocket 7B on the powder assembly vessel 24 can be rotated by ANSI roller chain 8. The roller chain is driven by a sprocket 7A welded to a motor 6. When the sprocket 7B is rotated, the entire assembly 25 will be rotated. In this embodiment, a motor with 50 rotations per minute is used, but in other embodiments this rate may be adjusted to minimize sintering. In order to prevent tangling of the gas supply line 1, a rotary union 2 held in place by clamp 26 can be used.

After the powder has been heat treated for a sufficient period of time to achieve the desired microstructural changes, the assembly 25 is removed from the furnace 11. In other embodiments, the assembly 25 may be left in the furnace 11 but internal cooling pipes through the powder assembly vessel 24 are used to cool the powder. In yet other embodiments, powder may be blown out of vessel 24 into a separate cooling vessel. In this embodiment, this is achieved by placing assembly 25 into a bath of brine 26 that is agitated by compressed air 27. Conduction of heat through the vessel walls 21 of the powder assembly vessel 24 allows the powder to be cooled at a sufficiently high rate to achieve the desired microstructure.

The heating and cooling phases can be repeated if desired. In some embodiments, the methods can include heating and cooling the powders for one, two, three, four, or more times.

In some embodiments, the heat treated particles can comprise coarse granular materials. In order to efficiently make use of the particles, the particles can be milled (or ground) to reduce the particle size and increase their effective surface area.

The treated particles can be stored before use in an additive manufacturing process. The storage temperature can depend on the alloy present. In some embodiments, the treated particles can be stored at room temperature or in a freezer before use. For example, aluminum alloys that are strengthened by precipitates can be stored at a temperature of −20° C. or less for storage times greater than 1 week.

In some embodiments, the treated particles can be used in an additive manufacturing process. In some embodiments, an additive manufacturing device can be included in the apparatuses disclosed herein. Such additive manufacturing device can include a cold spray deposition apparatus. The treated particles can also be used in powder metallurgy applications where metal powders are compressed or deformed to aid consolidation and/or are solid state processes. Examples include powder die pressing, additive friction stir (AFS), roll compaction of metal powders (powder rolling), hot isostatic pressing (HIP), and cold isostatic pressing (CIP).

As described herein, the heating and cooling treatment can improve the microstructure of the particles. The improved microstructure can result in an improved deposition efficiency when used in manufacturing processes such as cold spray. In some embodiments, the deposition efficiency of the treated particles can be improved by at least 10% (for example, at least 15%, at least 20%, at least 25%, at least 30%, at least 35%, at least 40%, at least 45%, at least 50%, at least 60%, or at least 75%) compared to an untreated particle.

EXAMPLES

The following examples are for purposes of illustration only and are not intended to limit the scope of the claims.

Example 1: Preparation of Heat Treated Particles

A prototype apparatus as shown in FIG. 3 was used to treat AA7075 powder. As-received gas-atomized −325 mesh AA7075 aluminum powder was loaded into the heat treatment vessel. Before heating up the furnace, the vessel was purged and filled with an inert gas, in this case helium. The furnace was heated then to the solutionizing temperature for AA7075, in this case 489° C. to 501° C. After the furnace reached the solutionizing temperature, the vessel was held at this temperature for 120 minutes to ensure complete dissolution of the intermetallics occurred. Throughout the solution heat treatment process, the vessel was rotated at 50 RPM. After the solution heat treatment step was finished, the motor was disconnected from the assembly so the vessel could be removed from the furnace and quenched in agitated brine at room temperature. The time between removing the vessel and placing the vessel in the brine bath did not exceed 10 seconds. The average cooling rate through the critical temperature range was measured to be 50° C./s. After being removed from the vessel, the powder was ball milled for 2 minutes at 120 RPM in a 2 inch diameter vessel with ⅜" diameter steel balls to eliminate agglomeration. Following removal from the ball milling canister, the treated powder was placed in a freezer at −20° C. freezer until used for cold spraying. Powders were not allowed to be at room temperature for more than 15 minutes before being used for cold spray.

Figure 6:
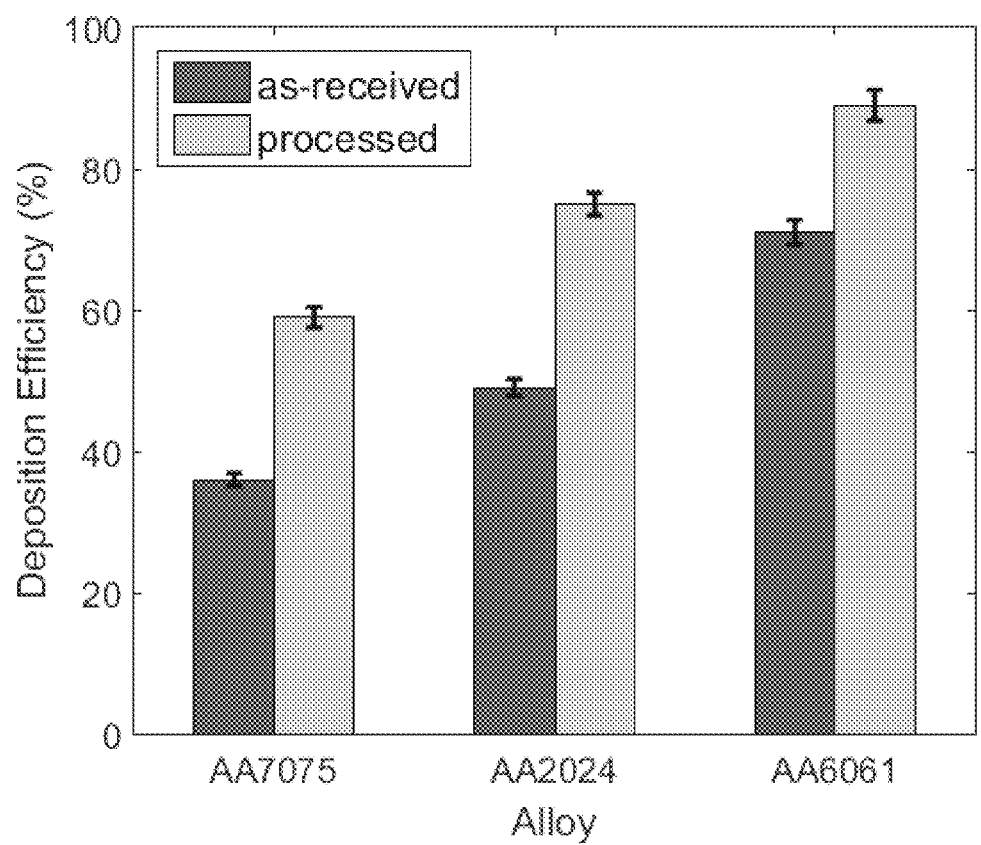
FIG. 6 is a bar graph showing the improvements in deposition efficiency measured for as-received powders versus processed powders for three different engineering aluminum alloys (AA7075, AA2024, and AA6061).

Results:

The process normalized the microstructure of as-received AA7075 powders. (FIGS. 2 and 4A-4D). The processed powder did not show a reduction in flowability after processing, indicating sintering has been successfully controlled. The process was also able to improve the deposition efficiency of as-received AA7075 powder from about 35% to about 60%, as-received AA2024 powder from about 50% to about 75%, and as-received AA6061 powder from about 70% to about 85% sprayed at otherwise identical conditions (FIG. 6). Cold spray deposits sprayed with processed powders produced a more normalized or homogenized microstructure (FIGS. 5A-5D).

Embodiments of the Disclosure

Disclosed herein are methods for processing a powder alloy, the method comprising: uniformly heating the powder alloy in an inert atmosphere at its solutionizing temperature, and cooling the heated powder alloy to form treated particles, wherein cooling is at a rate sufficient to reduce an intermetallic volume fraction of the treated particles by at least 50%, compared to the intermetallic volume fraction of the powder alloy.

Also disclosed are methods for processing a powder alloy, the method comprising: uniformly heating the powder alloy powder alloy in an inert atmosphere at its solutionizing temperature, and cooling the heated powder alloy at a rate of at least 5° C./s, wherein intermetallic precipitation of the treated powder is lower than the intermetallic precipitation of the powder alloy.

The method of any one of the preceding embodiments, wherein the powder alloy comprises greater than 50% by weight of aluminum, titanium, cobalt, magnesium, iron, nickel, copper, or a combination thereof.

The method of any one of the preceding embodiments, wherein the powder alloy is a 2000 series aluminum alloy, a 6000 series aluminum alloy, a 7000 series aluminum alloy, an alpha-beta titanium alloy, a nickel-based superalloy, a heat treatable magnesium alloy, a cobalt superalloy, a maraging steel, or a copper-beryllium alloy.

The method of any one of the preceding embodiments, wherein the powder alloy is a 5000 series aluminum alloy, an austenitic stainless steel alloy, a brass alloy, a tool steel alloy, an oxide dispersion strengthened steel alloy, or a tantalum alloy.

The method of any one of the preceding embodiments, wherein the powder alloy is heated at a temperature below its solidus temperature.

The method of any one of the preceding embodiments, wherein the powder alloy is heated at a temperature between its solvus and solidus temperature.

The method of any one of the preceding embodiments, wherein the powder alloy is heated at a temperature of 1200° C. or less.

The method of any one of the preceding embodiments, wherein the powder alloy is heated at a temperature from 400° C. to 1200° C.

The method of any one of the preceding embodiments, wherein the powder alloy is heated at a temperature of less than 1100° C.

The method of any one of the preceding embodiments, wherein uniformly heating the powder comprises mechanical agitation of the powder during heating.

The method of any one of the preceding embodiments, wherein the powder alloy is heated for at least 5 minutes.

The method of any one of the preceding embodiments, wherein the heated powder alloy is cooled at a rate of greater than 5° C./s.

The method of any one of the preceding embodiments, wherein the heated powder alloy is cooled at a rate of at least 10° C./s.

The method of any one of the preceding embodiments, wherein the heated powder alloy is cooled at a rate of at least 50° C./s.

The method of any one of the preceding embodiments, wherein the heated powder alloy is cooled at a rate of at least 100° C./s.

The method of any one of the preceding embodiments, wherein the heated powder alloy is cooled to room temperature.

The method of any one of the preceding embodiments, wherein the cooling step is carried out within 50 seconds.

The method of any one of the preceding embodiments, further comprising repeating the heating and cooling method steps.

The method of any one of the preceding embodiments, further comprising milling the treated particles after the cooling step.

The method of any one of the preceding embodiments, wherein the treated particles comprise an intermetallic volume fraction that is at least 50% lower than the intermetallic volume fraction of the powder alloy.

The method of any one of the preceding embodiments, wherein the intermetallic volume fraction of the treated particles is less than 1%.

The method of any one of the preceding embodiments, further comprising a step of conducting a manufacturing process using the treated particles.

The method of any one of the preceding embodiments, wherein the manufacturing process is cold gas dynamic spray.

A method for processing a powder alloy, the method comprising: uniformly heating the powder alloy in an inert atmosphere at its solutionizing temperature, and cooling the heated powder alloy at a rate of at least 5° C./s to form treated particles comprising an intermetallic volume fraction that is at least 50% lower than the intermetallic volume fraction of the powder alloy is disclosed.

A method for processing a powder aluminum alloy, the method comprising: uniformly heating the powder aluminum alloy to a temperature of 550° C. or less in an inert atmosphere, and cooling the heated powder aluminum alloy at a rate of at least 10° C./s to a temperature between 450° C. and 200° C. to form treated particles is also disclosed.

An apparatus comprising a furnace, a powder assembly vessel positioned in the furnace, wherein the powder assembly vessel comprises an inlet through which a gas or a powder enter into the powder assembly vessel, a rotary assembly connected to the powder assembly vessel which is capable of rotating the powder assembly vessel, a cooling system capable of cooling a powder in the powder assembly vessel at a rate of at least 5° C./s, and a device for depositing a heat treated particle obtained from the cooling system to a surface of a substrate is disclosed.

The apparatus of the preceding embodiment, wherein the powder assembly vessel comprises a sensor for monitoring and/or controlling the temperature of the powder assembly vessel.

The apparatus of any one of the preceding embodiments, wherein the powder assembly vessel is comprised of a high temperature alloy.

The apparatus of any one of the preceding embodiments, wherein an inert gas source is in communication with the inlet of the powder assembly vessel.

The apparatus of any one of the preceding embodiments, wherein the powder assembly vessel further comprises a device for excluding an interior portion of the powder assembly vessel during heat treatment.

The apparatus of any one of the preceding embodiments, wherein the cooling system is external of the powder assembly vessel, within the powder assembly vessel, or a combination thereof.

The apparatus of any one of the preceding embodiments, wherein the device for depositing the heat treated particle is a cold gas dynamic spray assembly.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing a powder alloy, the method comprising:
   a. uniformly heating the powder alloy by mechanically rotating the powder alloy in an inert atmosphere at its solutionizing temperature,
   b. holding the heated powder alloy at the solutionizing temperature for at least 5 minutes to allow complete dissolution of intermetallic fractions present in the powder alloy while simultaneously continuing to mechanically rotate the heated powder alloy, and
   c. cooling the heated powder alloy at a rate of at least 25° C./s to form treated particles,
   wherein the powder alloy comprises greater than 50% by weight of aluminum, titanium, cobalt, magnesium, iron, nickel, copper, or a combination thereof and wherein an intermetallic volume fraction of the treated particles is reduced by at least 80%, compared to the intermetallic volume fraction of the powder alloy prior to heat treatment.

2. The method of claim 1, wherein the powder alloy comprises greater than 50% by weight of aluminum.

3. The method of claim 1, wherein the powder alloy is a 2000 series aluminum alloy, a 6000 series aluminum alloy, a 7000 series aluminum alloy, an alpha-beta titanium alloy, a nickel-based superalloy, a heat treatable magnesium alloy, a cobalt superalloy, a maraging steel, or a copper-beryllium alloy.

4. The method of claim 1, wherein the powder alloy is heated at a temperature from 400° C. to 1200° C.

5. The method of claim 1, wherein the heated powder alloy is cooled at a rate of at least 50° C./s.

6. The method of claim 1, wherein the heated powder alloy is cooled at a rate of at least 100° C./s.

7. The method of claim 1, further comprising repeating steps (a) and (b).

8. The method of claim 1, further comprising milling the treated particles after step (b).

9. The method of claim 1, wherein the intermetallic volume fraction of the treated particles is less than 1%.

10. The method of claim 1, further comprising step c) conducting a manufacturing process using the treated particles.

11. The method of claim 10, wherein the manufacturing process is cold gas dynamic spray.

12. The method of claim 1 comprising:
   a. uniformly heating a powder aluminum alloy by mechanically rotating the powder aluminum alloy, to a temperature of 550° C. or less in an inert atmosphere, and
   b. holding the heated powder aluminum alloy at the temperature in step a, for at least 5 minutes to allow complete dissolution of intermetallic fractions present in the powder aluminum alloy while simultaneously continuing to mechanically rotate the heated powder aluminum alloy; and
   c. cooling the heated powder aluminum alloy at a rate of at least 25° C./s to a temperature between 450° C. and 200° C. to form treated particles.

* * * * *